(12) United States Patent
Mousazadeh et al.

(10) Patent No.: US 11,994,939 B2
(45) Date of Patent: May 28, 2024

(54) SYSTEMS AND METHODS FOR GENERATING REMEDY RECOMMENDATIONS FOR POWER AND PERFORMANCE ISSUES WITHIN SEMICONDUCTOR SOFTWARE AND HARDWARE

(71) Applicants: Advanced Micro Devices, Inc., Santa Clara, CA (US); ATI Technologies ULC, Markham (CA)

(72) Inventors: Mohammad Hamed Mousazadeh, Markham (CA); Arpit Patel, Markham (CA); Gabor Sines, Markham (CA); Omer Irshad, Markham (CA); Philippe John Louis Yu, Markham (CA); Zongjie Yan, Markham (CA); Ian Charles Colbert, San Diego, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/958,116

(22) Filed: Sep. 30, 2022

(65) Prior Publication Data

US 2024/0111620 A1 Apr. 4, 2024

(51) Int. Cl.
*G06F 11/07* (2006.01)
*G06N 20/00* (2019.01)

(52) U.S. Cl.
CPC ........ *G06F 11/079* (2013.01); *G06F 11/0706* (2013.01); *G06N 20/00* (2019.01)

(58) Field of Classification Search
CPC .... G06F 11/0706; G06F 11/079; G06N 20/00
See application file for complete search history.

(56) References Cited

U.S. PATENT DOCUMENTS

| 9,916,194 B2 * | 3/2018 | Pang ................. G06F 11/34 |
| 10,063,406 B2 * | 8/2018 | Tapia ................ G06N 20/00 |
| 2017/0097860 A1 | 4/2017 | Pang |

(Continued)

FOREIGN PATENT DOCUMENTS

CN 110825549 A 2/2020

OTHER PUBLICATIONS

International Search Report and Written Opinion dated Jan. 23, 2024, from the corresponding International Application No. PCT/US2023/075470; 10 pages.

*Primary Examiner* — Joseph R Kudirka
(74) *Attorney, Agent, or Firm* — Greenberg Traurig, LLP

(57) ABSTRACT

The disclosed computer-implemented method for generating remedy recommendations for power and performance issues within semiconductor software and hardware. For example, the disclosed systems and methods can apply a rule-based model to telemetry data to generate rule-based root-cause outputs as well as telemetry-based unknown outputs. The disclosed systems and methods can further apply a root-cause machine learning model to the telemetry-based unknown outputs to analyze deep and complex failure patterns with the telemetry-based unknown outputs to ultimately generate one or more root-cause remedy recommendations that are specific to the identified failure and the client computing device that is experiencing that failure.

20 Claims, 3 Drawing Sheets

(56) References Cited

U.S. PATENT DOCUMENTS

| | | |
|---|---|---|
| 2019/0163551 A1 | 5/2019 | Cheriton |
| 2022/0066852 A1 | 3/2022 | Ramanujan et al. |
| 2022/0023706 A1 | 7/2022 | Giddings et al. |
| 2022/0237063 A1* | 7/2022 | Giddings .............. G06F 11/079 |

* cited by examiner

SYSTEMS AND METHODS FOR GENERATING REMEDY RECOMMENDATIONS FOR POWER AND PERFORMANCE ISSUES WITHIN SEMICONDUCTOR SOFTWARE AND HARDWARE

BACKGROUND

Example automated analysis systems often perform rule-based analysis of telemetric data associated with semiconductor software and/or hardware failure, performance, and power issues.

BRIEF DESCRIPTION OF THE DRAWINGS

The accompanying drawings illustrate a number of example implementations and are a part of the specification. Together with the following description, these drawings demonstrate and explain various principles of the present disclosure.

Figure 1:
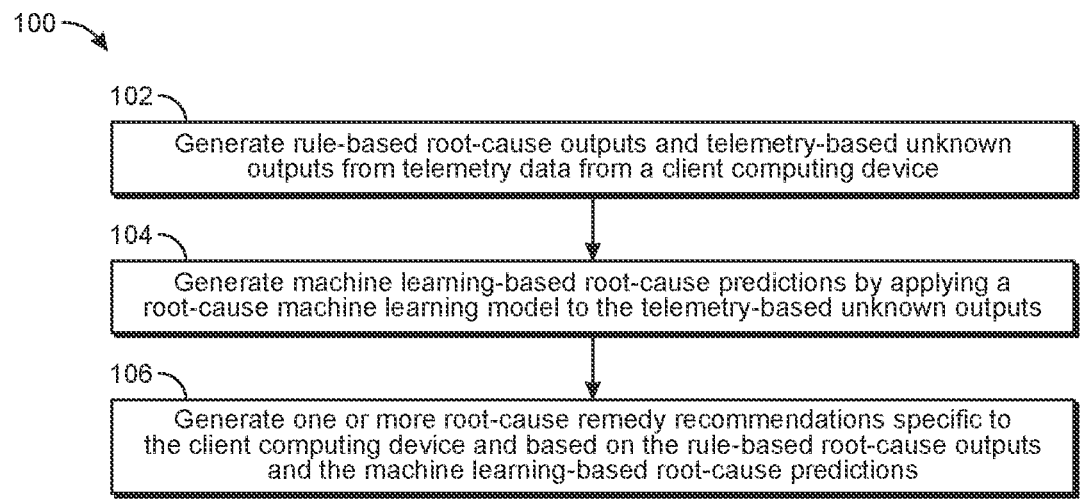
FIG. 1 is a flow diagram of an exemplary computer-implemented method for generating remedy recommendations for power and performance issues within semiconductor software and hardware according to one or more implementations.

Throughout the drawings, identical reference characters and descriptions indicate similar, but not necessarily identical, elements. While the example implementations described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to systems and methods for generating remedy recommendations for power and performance issues within semiconductor software and hardware. As mentioned above, example analytical systems can use a rule-based approach in analyzing telemetric data from one or more telemetric sources associated with computing devices. Often this telemetric data can be complex and/or meaningless (e.g., "noisy"). Example analytical systems generally fail to recognize such complex and noisy data patterns in connection with failure, performance, and power issues associated with semiconductor software and hardware. Moreover, example analytics systems are often rigidly limited to expected telemetric data patterns and progressions. Thus, when unexpected telemetric is received, example analytical systems generally produce outputs that require additional manual analysis.

In more detail, example analytical systems often employ a rigid, rule-based analysis of telemetric data in attempts to determine root causes of various types of system failures. This rule-based approach, however, is only effective when the telemetric data falls into expected formats and fairly simple patterns. As such, example analytical systems are often limited to only high-level issue analysis. Despite this, as mentioned above, root causes of some system failures and other issues can only be determined in response to deep analysis of complex patterns within noisy telemetric data. In light of this, example analytical systems can fail to remedy as much as 50% of reported system failures.

To remedy these and other problems, the systems and methods described herein efficiently generate accurate and device-specific remedies to failure, performance, and power issues indicated by complex and potentially noisy telemetric data. For example, the systems and methods described herein can receive and transform telemetric data from a variety of telemetric sources based on both rule-based and machine learning-based models. The systems and methods described herein can further apply these models to the transformed telemetric data to generate accurate predictions indicating root causes of the issues experienced by the semiconductor software and/or hardware. Additionally, the systems and methods described herein can further generate remedy recommendations based on the indicated root causes that an end-user can apply to a client computing device to solve these issues.

As such, the systems and methods described herein provide accurate, efficient, flexible, and resilient solutions to the problems experienced by example analytical systems. For example, as mentioned above, example systems inflexibly require that telemetric data be received in expected formats and fairly simple patterns. Accordingly, when such example systems receive complex and noisy data, these systems fail to generate meaningful and accurate root cause predictions. In contrast, the systems and methods described herein include a resilient data pipeline that can receive and transform complex and noisy/unexpected telemetric data into usable formats. By applying both rule-based and machine learning-based models to this transformed telemetric data within the resilient data pipeline, the systems and methods described herein can analyze deep failure patterns to generate accurate root cause predictions. The systems and methods described herein can further generate accurate remedy recommendations from these predictions that are tailored to the end-user computing device so as to remedy the failure, performance, and power issues experienced by that computing device.

As will be described in greater detail below, the present disclosure describes various systems and methods for generating accurate and device-specific remedies to failure, performance, and power issues. In one implementation, a method for generating device-specific remedies to failure, performance, and power issues can include generating rule-based root-cause outputs and telemetry-based unknown outputs from telemetry data from a client computing device and generating machine learning-based root-cause predictions by applying a root-cause machine learning model to the telemetry-based unknown outputs. The method can further include generating one or more root-cause recommendations specific to the client computing device and based on the rule-based root-cause outputs and the machine learning-based root-cause predictions.

In one or more implementations, the method can further include, prior to generating the rule-based root-cause outputs and telemetry-based unknown outputs, receiving the telemetry data from the client computing device, and parsing the telemetry data based on a rule-based model and the root-cause machine learning model. In some implementations, receiving the telemetry data from the client computing device can include receiving raw and unstructured data from one or more of offline logs and real-time telemetry sources.

Additionally, in some implementations, parsing the telemetry data based on the rule-based model and the root-cause machine learning model can include parsing the telemetry data into structured data based on one or more of the offline logs and the real-time telemetry sources, parsing the structured data into attributes specific to the rule-based model, and parsing the structured data into attributes specific to the root-cause machine learning model. Moreover, parsing the telemetry data based on the rule-based model and the root-cause machine learning model further can also include generating one or more of engineered features, data encodings, customized mappings, and data augmentations based on the attributes specific to the rule-based model and the attributes specific to the root-cause machine learning model.

In one or more implementations, the method can also include modifying the rule-based root-cause outputs in light of the machine learning-based root-cause predictions, and generating client-specific root-cause results from the machine learning-based root-cause predictions and the modified rule-based root-cause outputs. In some implementations, the one or more root-cause recommendations specific to the client computing device are generated by applying a recommendation engine to the client-specific root-cause results, and the recommendation engine can include a plurality of trained machine learning-based recommendation units. In some implementations, the recommendation engine can further include one or more of lookup tables or rule-based recommendations.

In at least one implementation, the method can also include generating a filtered remedy recommendation tailored to a user security level associated with the client computing device based on the one or more root-cause recommendations specific to the client computing device and end-user data extracted from the telemetry data from the client computing device. Additionally, in at least one implementation, the method can further include generating machine learning-based unknowns by applying the root-cause machine learning model to the telemetry-based unknown outputs, and re-training the root-cause machine learning model based on the machine learning-based unknowns.

In one example implementation, a system for generating device-specific remedies to failure, performance, and power issues can include at least one processor, and a physical memory including computer-executable instructions that, when executed by the at least one processor, cause the at least one processor to perform acts including generating rule-based root-cause predictions and telemetry-based unknown outputs from telemetry data from a client computing device, generating machine learning-based root-cause predictions by applying a root-cause machine learning model to the telemetry-based unknown outputs, and generating one or more root-cause recommendations specific to the client computing device and based on the rule-based root-cause outputs and the machine learning-based root-cause predictions.

In some example implementations, the above-described method can be encoded as computer-readable instructions on a non-transitory computer-readable medium. For example, a computer-readable medium can include one or more computer-executable instructions that, when executed by at least one processor of a computing device cause the computing device to generate rule-based root-cause outputs and telemetry-based unknown outputs from telemetry data from a client computing device, generate machine learning-based root-cause predictions by applying a root-cause machine learning model to the telemetry-based unknown outputs, and generate one or more root-cause recommendations specific to the client computing device and based on the rule-based root-cause outputs and the machine learning-based root-cause predictions.

Features from any of the implementations described herein can be used in combination with one another in accordance with the general principles described herein. These and other implementations, features, and advantages will be more fully understood upon reading the following detailed description in conjunction with the accompanying drawings and claims.

Figure 2:
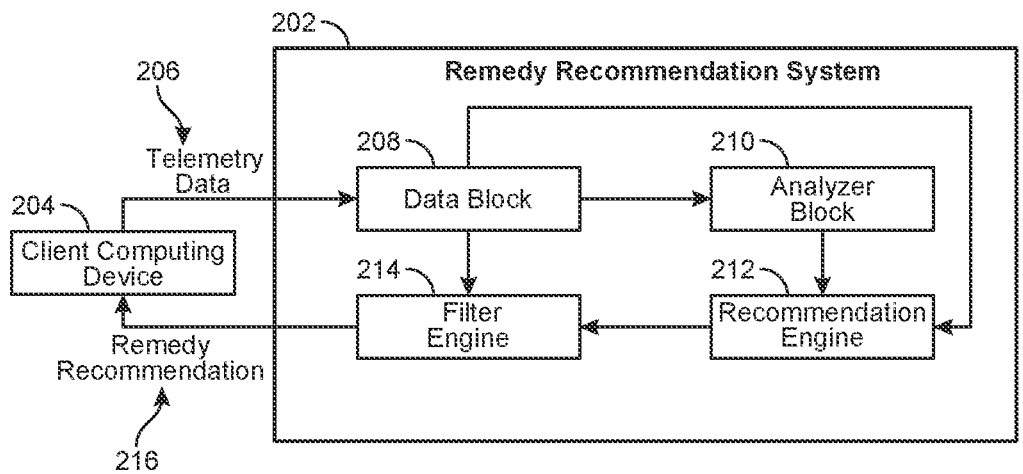
FIG. 2 is an overview sequence diagram of a remedy recommendation system generating a device-specific remedy recommendation that addresses one or more root causes of a failure, power, or performance issue according to one or more implementations.
Figure 3:
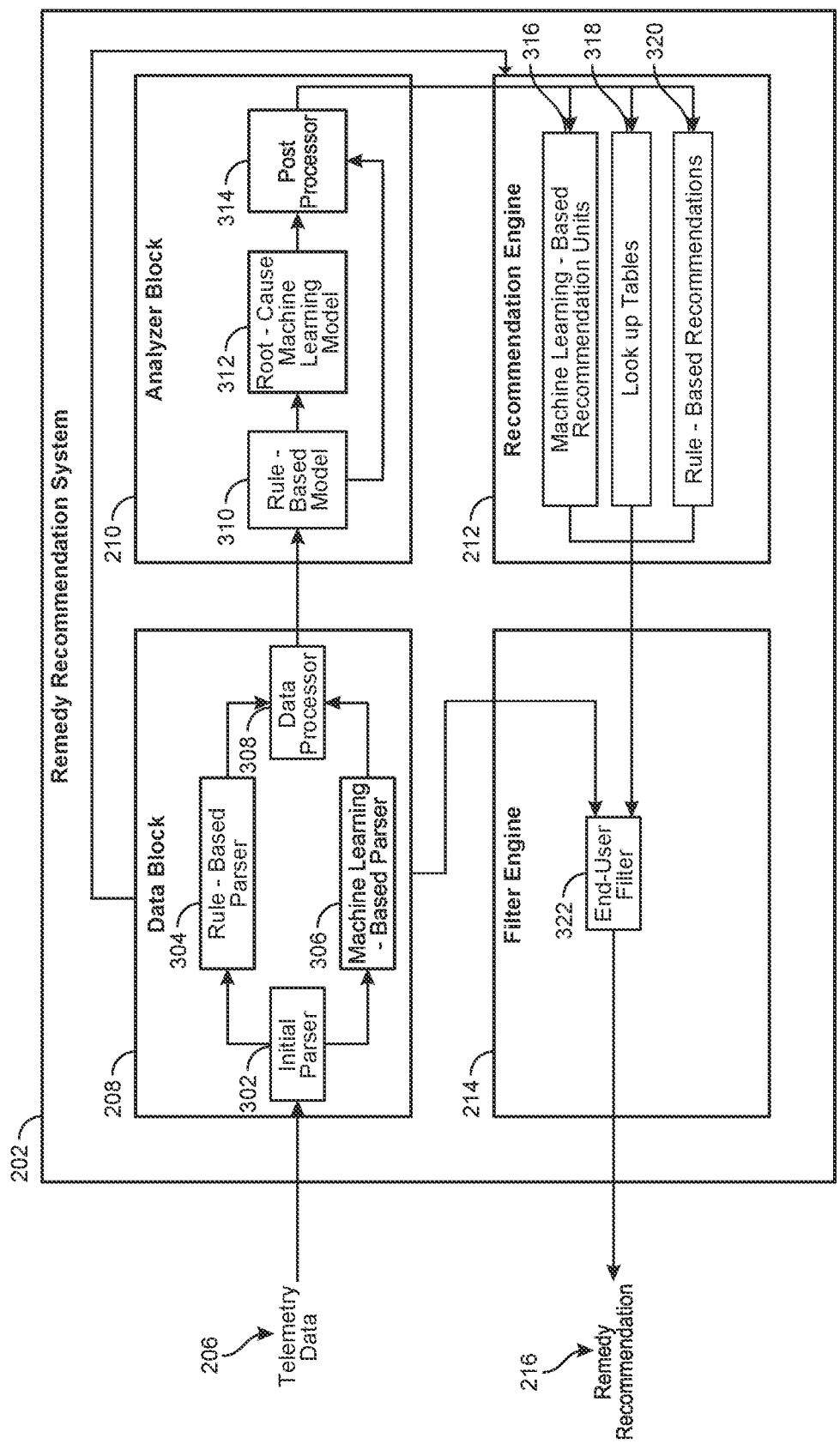
FIG. 3 is a detailed sequence diagram of the remedy recommendation system generating a device-specific remedy recommendation according to one or more implementations.
Figure 4:
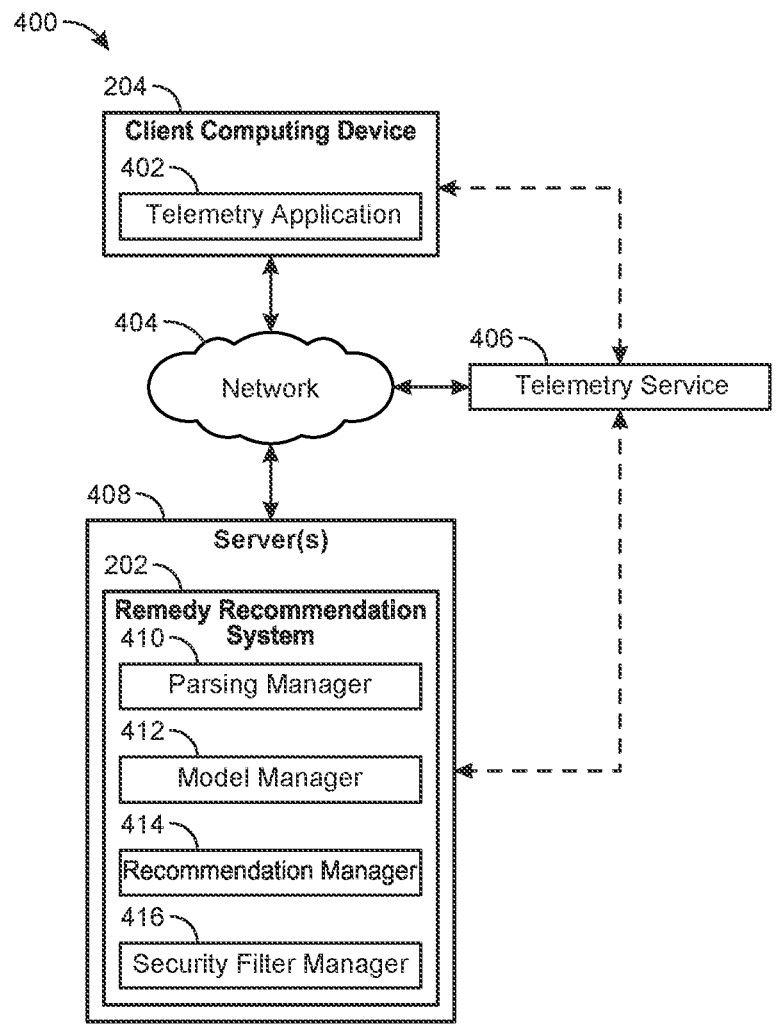
FIG. 4 is a detailed diagram of the remedy recommendation system according to one or more implementations.

The following will provide, with reference to FIGS. 1-3, detailed descriptions of example systems and methods for generating resilient and device-specific remedies to failure, performance, and power issues. For example, FIG. 1 provides detailed descriptions of corresponding computer-implemented methods for the same. Additionally, FIG. 2 shows an example overview sequence diagram of a remedy recommendation system generating a device-specific remedy recommendation that addresses one or more root causes of a failure, power, or performance issue indicated by telemetry data associated with a client computing device. Moreover, FIG. 3 illustrates an example detailed sequence diagram of the same process. Finally, FIG. 4 illustrates a detailed diagram of the systems and methods described herein.

FIG. 1 is a flow diagram of an example computer-implemented method 100 for generating resilient and device-specific remedy recommendations addressing root causes of failure, performance, and power issues. The steps shown in FIG. 1 can be performed by any suitable computer-executable code and/or computer hardware. In one example, each of the steps shown in FIG. 1 can represent an algorithm whose structure includes and/or is represented by multiple sub-steps, examples of which will be provided in greater detail below.

As illustrated in FIG. 1, at step 102 the remedy recommendation system can generate rule-based root-cause outputs and telemetry-based unknown outputs from telemetry data from a client computing device. For example, the remedy recommendation system can receive telemetry data from any of multiple telemetric sources (e.g., including the client computing device as well as other telemetric sources associated with the client computing device) such as offline logs and/or other real-time sources. In one or more implementations, the remedy recommendation system can parse, process, and otherwise transform the received telemetry data based on one or more models. For instance, the remedy recommendation system can parse the telemetry data according to a rule-based model and according to a root-cause machine learning-based model.

In at least one implementation, the remedy recommendation system can apply the rule-based model to the parsed telemetry data to generate the rule-based root-cause outputs and the telemetry-based unknown outputs. For example, the rule-based model can include one or more of rules, heuristics, look-up tables, decision trees, and so forth. Accordingly in at least one implementation, the rule-based model generates rule-based root-cause outputs by applying the rule-based model to parsed telemetry data including known or expected patterns, values, characteristics, attributes, and so forth. It follows that, in some implementations, the telemetry-based unknown outputs can include the remaining telemetry data—potentially including complex patterns and/or noisy data—that the rule-based model could not handle.

Additionally, at step 104 the remedy recommendation system can generate machine learning-based root-cause predictions by applying a root-cause machine learning model to the telemetry-based unknown outputs. For example, in at least one implementation, the remedy recommendation system can apply the root-cause machine learning model to the telemetry-based unknown outputs to generate machine learning-based root-cause predictions. In one or more implementations, the remedy recommendation system can train the root-cause machine learning model to predict root causes of failure, performance, and power issues based on telemetry data that cannot be analyzed by the rule-based model. As such, the root-cause machine learning model can understand deep failure patterns presented by the telemetric data that were previously impossible to analyze under a rule-based approach in order to predict root causes of various types of failures.

Moreover, as further shown in FIG. 1, at step 106 the remedy recommendation system can generate one or more root-cause remedy recommendations specific to the client computing device and based on the rule-based root-cause outputs and the machine learning-based root-cause predictions. For example, the remedy recommendation system can apply a recommendation engine to the root causes indicated by the rule-based root-cause outputs and the machine learning-based root-cause predictions to generate at least one root-cause remedy recommendation that is specific to the client computing device. In one or more implementations, the remedy recommendation generated by the recommendation engine can include instructions specific to the client computing device regarding, for example, software updates, disabling problematic system features, enabling various system features, modifying or reconfiguring certain software or hardware features, and so forth.

In one or more implementations, the remedy recommendation system described herein references many terms and phrases. For example, the term "root cause" can refer to an action performed by a client computing device that causes an issue. To illustrate, a root cause of a software failure issue can include a particular faulty instruction executed by the client computing device. In some implementations, a root cause can further include an action performed by a client computing device that does not cause an issue, but rather causes the other actions to be performed that do cause issues (e.g., a cascading failure).

As used herein, the term "model" can refer to any group of computer instructions that generate one or more outputs when applied to one or more inputs. For example, a "rule-based model" can apply to one or more rule-based heuristics (e.g., decision trees, if/then tables, graphs) that generate one or more outputs when applied to one or more inputs including structured data in expected formats. Additionally, a "machine learning-based model" or "root-cause machine learning model" can refer to layers of weighted nodes that are trained to generate predictions at acceptable confidence levels when applied to one or more input vectors. A machine learning model can include one or more of a convolutional neural network, a recurrent neural network, a feedforward neural network, or a perceptron neural network. In additional implementations, a machine learning model can include other types of artificial networks.

As used herein, "telemetry data" can refer to a collection of observed data values associated with the functioning of a client computing device. For example, telemetry data can include register values, stack values, accelerator measurements (e.g., heat measurement, clock speed measurement), logged values (e.g., debug statements, software write outputs), and so forth. Telemetry data can be collected at one or more telemetry sources. For example, telemetry data can be collected by one or more components (e.g., installed software) of the client computing device, or by a third-party telemetry source (e.g., a service that monitors or receives monitoring statements from the client computing device. Telemetry data can be collected, transmitted, and/or received in real-time as well as after the fact (e.g., as with telemetry data from an offline log).

As used herein, a "remedy recommendation" can refer to a generated output that includes information associated with a root-cause of an issue experienced by a client computing device. For example, a remedy recommendation can include a full description of the issue and the root-cause of that issue. A remedy recommendation can further include instructions for remedying the root-cause of that issue. For example, the remedy recommendation can include instructions for permanently remedying the issue (e.g., "update your game application to version x.y.z"), instructions for temporarily remedying the issue (e.g., "increase your fan speed 70% to reduce thermal throttling"), or instructions for bypassing the issue. In one or more implementations, a remedy recommendation can be formatted as an email, an SMS message, a pop-up window, or other type of notification. Additionally, in some implementations, a remedy recommendation can include a selectable option for automatically fixing the identified issue.

As used herein, the term "user security level" can refer to a categorization associated with an end-user of a client computing device. For example, the systems and methods discussed herein can generate a remedy recommendation based on the user security level of the end-user such that the remedy recommendation does not include information that is overly sensitive or inappropriate for the end-user to view. An end-user can have a higher user security level such as "internal user" or "administrator." Conversely, an end-user can have a lower user security level such as "external user."

As mentioned above, the remedy recommendation system can efficiently and accurately generate remedy recommendations that are specific to an issue being experienced by a particular client computing device. FIG. 2 illustrates an overview sequence diagram of a remedy recommendation system 202 (e.g., the remedy recommendation system discussed above) generating a remedy recommendation 216 for a client computing device 204 based on telemetry data 206 associated with the client computing device 204.

In more detail, the remedy recommendation system 202 can receive the telemetry data 206 at a data block 208. In one or more implementations, the data block 208 can include one or more parsers, processors, translators, and so forth. For example, the components of the data block 208 can parse the received telemetry data 206 according to an analyzer block 210. In at least one implementation, the data block 208 can parse the telemetry data 206 according to one or more models within the analyzer block 210.

In one or more implementations, as further shown in FIG. 2, the data block 208 can transmit the parsed telemetry data 206 to the analyzer block 210 for root-cause analysis. In at least one implementation, the analyzer block 210 can include multiple models that process some or all of the parsed telemetry data 206 in parallel or in sequence. Furthermore, the analyzer block 210 can utilize the results of one model as some or all of the inputs into another model. In one or more implementations, the analyzer block 210 generates client-specific root-cause results based on the results, outputs, and/or predictions generated by the one or more models within the analyzer block 210.

With the client-specific root-cause results of the analyzer block 210, the remedy recommendation system 202 can generate one or more root-cause remedy recommendations. For example, the remedy recommendation system 202 can apply a recommendation engine 212 to the client-specific root-cause results and a subset of the parsed telemetry data generated by the data block 208. In one or more implementations, the recommendation engine 212 can include one or more of machine learning-based units, look-up tables, rule-based recommendations, and other heuristics. Accordingly, the remedy recommendation system 202 can apply the recommendation engine 212 to the client-specific root-cause results and other telemetry data to generate root-cause remedy recommendation that include specific instructions for modifying, configuring, installing, disabling, enabling, and/or upgrading one or more components of the client computing device 204 to remedy a specific failure, performance, and/or power issue being experienced by the client computing device 204.

In at least one implementation, the client computing device 204 can be associated with a specific user security level. To illustrate, the client computing device 204 can be associated with a high security level (e.g., as with an end-user who has administrative access to the client computing device 204), or a low security level (e.g., as with a standard non-administrative end-user). Accordingly, the remedy recommendation system 202 can generate the filtered remedy recommendation 216 by applying a filter engine 214 to the one or more root-cause remedy recommendations generated by the recommendation engine 212.

For example, the filter engine 214 can determine a security level of the client computing device 204 based on end-user data extracted from the telemetry data 206 by the data block 208. Based on this security level, the filter engine 214 can filter the one or more root-cause remedy recommendations to include information and instructions that are appropriate to that security level. For instance, the filter engine 214 can filter the one or more root-cause remedy recommendations to include security level appropriate data potentially including one or more of a detailed fault explanation, fault patterns, and client computing device specific recommendations. The filter engine 214 can then transmit the filtered remedy recommendation 216 to the client computing device 204.

FIG. 3 illustrates a detailed diagram of the remedy recommendation system 202 generating one or more remedy recommendations 216. For example, as shown in FIG. 3, the remedy recommendation system 202 can receive telemetry data 206 at an initial parser 302 of the data block 208. In one or more implementations, the initial parser 302 can receive raw and unstructured data from various sources including offline logs and real-time telemetry sources. The initial parser 302 can further separate, transform, process, translate, and otherwise configure the telemetry data 206 based on the one or more sources of the telemetry data 206. To illustrate, the initial parser 302 can parse telemetry data from a particular telemetry source based on knowledge of how that telemetry source patterns and/or structures its telemetry data. Additionally, the initial parser 302 can further extract all information from the received telemetry data 206—even without knowledge of the telemetry source's formatting, patterns, and/or structure. For example, the initial parser 302 can extract all information and attempt to label and/or otherwise categorize the extracted data into a structured format that is usable by the rule-based parser 304, the machine learning-based parser 306, the analyzer block 210, the recommendation engine 212, and/or the filter engine 214.

In one or more implementations, the data block 208 can further include a rule-based parser 304 and a machine learning-based parser 306. In at least one implementation, the rule-based parser 304 and the machine learning-based parser 306 can further parse the telemetry data 206 based on one or more models within the analyzer block 210. For example, the rule-based parser 304 can further parse the outputs of the initial parser 302 based on an input structure of a rule-based model 310 within the analyzer block 210. Similarly, the machine learning-based parser 306 can further parse the outputs of the initial parser 302 based on an input structure of a root-cause machine learning model 312. For instance, either or both of the rule-based parser 304 and the machine learning-based parser 306 can further parse the telemetry data 206 by extracting certain attributes, features, and values (numerical and categorical) according to the rule-based model 310 and the root-cause machine learning model 312, respectively. In some implementations, the rule-based parser 304 and the machine learning-based parser 306 can parse the outputs of the initial parser 302 in parallel. In other implementations, the rule-based parser 304 and the machine learning-based parser 306 can operate serially or in sequence.

As further shown in FIG. 3, the data block 208 can further include a data processor 308 that can receive outputs from the rule-based parser 304 and the machine learning-based parser 306. In one or more implementations, the data processor 308 can generate, enumerate, and encode various data patterns (e.g., sequential patterns with timing information, logical patterns, etc.). For example, the data processor 308 can perform these tasks by generating one or more of engineered features, data encodings (e.g., via one hot encoding), customized mappings, and/or data augmentations. In at least one implementation, the data processor 308 can generate any of these outputs based on attributes specific to the rule-based model and/or attributes specific to the root-cause machine learning model.

As mentioned above, and as shown in FIG. 3, the remedy recommendation system 202 can generate root cause predictions at the analyzer block 210. In more detail, the rule-based model 310 can receive the transformed telemetry data 206 from the data processor 308 of the data block 208. In one or more implementations, the rule-based model 310 generates rule-based root-cause outputs and telemetry-based unknown outputs based on the received data. For example, the rule-based model 310 can include one or more of heuristics, look-up tables, decision trees, random forests, if/then statements, and so forth that are associated with potential root causes of various potential issues that a client computing device might experience. Accordingly, the rule-based model 310 can generate rule-based root-cause outputs by matching or otherwise correlating the received data with these heuristics, look-up tables, decision trees, random forests, if/then statements, and so forth. In at least one implementation, the rule-based model 310 can generate telemetry-based unknown outputs from subsets of the received data that fail to correlate with any of the rule-based approaches embodied by the rule-based model 310.

In one or more implementations, as mentioned above, the analyzer block 210 can further include a root-cause machine learning model 312. In at least one implementation, the root-cause machine learning model 312 can generate one or more machine learning-based root-case predictions based on the telemetry-based unknown outputs. For example, the root-cause machine learning model 312 can include a shallow neural network such as a multi-layer perceptron. Furthermore, the remedy recommendation system 202 can train the root-cause machine learning model 312 to learn telemetry-based patterns can be complex and/or can include noisy data. In some implementations, the remedy recommendation system 202 can further apply the root-cause machine learning model 312 to the rule-based root-cause outputs from the rule-based model 310 in addition to the telemetry-based unknown outputs.

Moreover, the analyzer block 210 can further include a post processor 314 that further modifies one or more of the outputs of the rule-based model 310 and the root-cause machine learning model 312. For example, in one implementation, the post processor 314 can analyze the rule-based root-cause outputs and/or the machine learning-based root-cause predictions to check for false outputs, null values, and other undesirable outputs. Additionally, in some implementations, the post processor 314 can modify the rule-based root-cause outputs generated by the rule-based model 310 in light of the machine learning-based root-cause predictions generated by the root-cause machine learning model 312. To illustrate, the post processor 314 can modify the rule-based root-cause outputs based on confidence levels associated with the machine learning-based root-cause predictions. Following this, the post processor 314 can generate client-specific root-cause results from the machine learning-based root-cause predictions and the potentially modified rule-based root-cause outputs. In one or more implementations, the client-specific root-cause results indicate a specific component, setting, and/or configuration of the hardware and/or software of the client computing device 204 that caused the failure, power, or performance issue experienced by the client computing device 204.

The remedy recommendation system 202 can further generate one or more root-cause remedy recommendations by applying the recommendation engine 212 to the client-specific root-cause results generated by the post processor 314 in the analyzer block 210 based on the rule-based root-cause outputs and the machine learning-based root-cause predictions. For example, in one or more implementations, the recommendation engine 212 can include one or more of machine learning-based recommendation units 316, look-up tables 318, and rule-based recommendations 320. For example, the recommendation engine 212 can apply the machine learning-based recommendation units 316 to the client-specific root-cause results to generate one or more root-cause remedy recommendations that are specific to the client computing device 204. Similarly, the recommendation engine 212 can correlate the client-specific root-cause results with the look-up tables 318 and/or the rule-based recommendations 320 to further generate the one or more root-cause remedy recommendations.

In some implementations, the recommendation engine 212 can utilize the look-up tables 318 and rule-based recommendations 320 in response to determining that the machine learning-based recommendation units 316 generated root-cause remedy recommendation with a low level of confidence. Additionally, in some implementations, the recommendation engine 212 can combine the remedy recommendations output by the machine learning-based recommendation units 316, the look-up tables 318, and the rule-based recommendations 320 to generate a final root-cause remedy recommendation. In additional implementations, the recommendation engine 212 can include fewer components, or additional components (e.g., a decision tree, a random forest, etc.).

In at least one implementation, the recommendation engine 212 can utilize end-user specific data (e.g., from the data block 208) in generating the root-cause remedy recommendation. To illustrate, the recommendation engine 212 can receive data from the data block 208 indicating that the end-user of the client computing device 204 frequently overclocks the accelerated processor of the client computing device 204. In response to determining that overclocking is likely the root cause of an issue that the client computing device 204 is experiencing, the recommendation engine 212 can incorporate this user behavior into the root-cause remedy recommendation. For example, the recommendation engine 212 can generate the root-cause remedy recommendation including a recommended accelerated processor clock setting for a user who does not overclock, but can generate a root-cause remedy recommendation including a maximum accelerated processor clock setting for the user who will likely overclock. As such, the recommendation engine 212 can generate root-cause remedy recommendations that are not only device-specific, but that are also specific to user's observed behaviors.

As mentioned above, the remedy recommendation system 202 can further tailor remedy recommendations according to a security level associated with the client computing device 204. For example, the remedy recommendation system 202 can apply an end-user filter 322 to the root-cause remedy recommendations in connection with end-user data to generate a final remedy recommendation 216. In more detail, the end-user filter 322 can receive end-user data extracted by the data block 208. Based on this end-user data, the end-user filter 322 can determine a security level associated with the client computing device 204 (e.g., with a user of the client computing device 204). The end-user filter 322 can then filter, reconfigure, enhance, or redact the root-cause remedy recommendation generated by the recommendation engine 212 according to the determined security level. For example, the end-user filter 322 can add or remove information to or from the root-cause remedy recommendation including, but not limited to: detailed fault explanations, fault patterns, and detailed recommendations for modifying, configuring, bypassing one or more hardware and/or software components. The filter engine 214 can further transmit this filtered root-cause remedy recommendation to the client computing device 204.

In one or more implementations, the filter engine 214 can further generate the final remedy recommendation 216 in a variety of ways. For example, the filter engine 214 can generate the final remedy recommendation 216 as part of a report (e.g., either standalone or within an application installed on the client computing device 204). In another implementation, the filter engine 214 can generate the final remedy recommendation 216 as a notification (e.g., a pop-up window, a banner notification, a system log entry) for the client computing device 204. Additionally, the filter engine 214 can generate the final remedy recommendation 216 as an electronic message to the user of the client computing device 204. For example, the filter engine 214 can generate the final remedy recommendation 216 as an email, a text message, a social media message, and so forth.

The remedy recommendation system 202 described herein can be implemented in a variety of ways. As such, FIG. 4 illustrates a block diagram of an example implementation 400 of the remedy recommendation system 202 as discussed throughout. For example, as shown in FIG. 4, the implementation 400 can include the remedy recommendation system 202 operating on a server(s) 408. As shown, the remedy recommendation system 202 can receive telemetry data over a network 404 from one or more of a telemetry application 402 installed on the client computing device 204, and a telemetry service 406.

In more detail, the remedy recommendation system 202 can operate as software or firmware and can include a parsing manager 410, a model manager 412, a recommendation manager 414, and a security filter manager 416. Although FIG. 4 illustrates the components 410-416 of the remedy recommendation system 202 as separate elements, one or more of the components 410-416 of the remedy recommendation system 202 can be combined in additional implementations. Similarly, in additional implementations, the remedy recommendation system 202 can include additional, fewer, or different components.

In certain implementations, the remedy recommendation system 202 can represent one or more software applications or programs that, when executed by a processor, can cause the processor to perform one or more tasks. For example, and as will be described in greater detail below, one or more of the components 410-416 of the remedy recommendation system 202 can represent software stored and configured to run on one or more computing devices. One or more of the components 410-416 of the remedy recommendation system 202 shown in FIG. 4 can also represent all or portions of one or more special-purpose computers configured to perform one or more tasks.

As mentioned above, and as shown in FIG. 4, the remedy recommendation system 202 can include the parsing manager 410. In one or more implementations, the parsing manager 410 can perform any of the functions described above in connection with the data block 208. For example, the parsing manager 410 can include and/or direct the initial parser 302, the rule-based parser 304, the machine learning-based parser 306, and/or the data processor 308. As such, the parsing manager 410 can receive telemetry data from one or more sources (e.g., including the telemetry application 402, the telemetry service 406, and other applications and services). In at least one implementation, the parsing manager 410 can generate and provide one or more interfaces that enable additional configuration of one or more of the initial parser 302, the rule-based parser 304, the machine learning-based parser 306, and the data processor 308. To illustrate, the parsing manager 410 can enable reconfiguration of one or more of the components of the data block 208. The parsing manager 410 can also enable the inclusion of one or more additional components within the data block 208, or can enable the removal of one or more of the components of the data block 208.

Additionally, as shown in FIG. 4, the remedy recommendation system 202 can include the model manager 412. In one or more implementations, the model manager 412 can generate, train, re-train, and apply one or more models to various inputs. For example, the model manager 412 can generate the rule-based model 310 within the analyzer block 210 including one or more lookup tables, decision trees, decision graphs, random forests, and additional heuristics. Additionally, the model manager 412 can generate and train the root-cause machine learning model 312. For example, the model manager 412 can generate and train a multi-layer perceptron to learn complex patterns deep within noisy telemetry data. Furthermore, the model manager 412 can generate and train the machine learning-based recommendation units 316 of the recommendation engine 212. For example, the model manager 412 can train the machine learning-based recommendation units 316 to generate a root-cause remedy recommendation based on both the client-specific root-cause results generated by the post processor 314 of the analyzer block 210 and the end-user behavioral data extracted by the data block 208.

In at least one implementation, the model manager 412 can periodically re-train one or more of the models utilized by the remedy recommendation system 202. For example, in one implementation, the root-cause machine learning model 312 can detect failures among a subset of the telemetry-based unknown outputs (e.g., an improvement by as much as 25%). In that implementation, the model manager 412 can re-train the root-cause machine learning model 312 utilizing the remainder of the telemetry-based unknown outputs. Additionally, the model manager 412 can re-train the root-cause machine learning model 312 based on user feedback associated with the final remedy recommendation 216 (e.g., whether the final remedy recommendation 216 was accurate, whether the final remedy recommendation 216 correctly solved the issue).

Furthermore, as mentioned above, the remedy recommendation system 202 can include the recommendation manager 414. In one or more implementations, the recommendation manager 414 generates, maintains, and applies the look-up tables 318 and the rule-based recommendations 320 within the recommendation engine 212. Additionally, the recommendation manager 414 can generate and provide one or more interfaces that enable reconfigurations and additions associated with the look-up tables 318 and the rule-based recommendations 320. For example, the recommendation manager 414 can enable reconfiguration of the look-up tables 318 and/or the rule-based recommendations 320 to include updated rules and remedy suggestions.

Also as mentioned above, the remedy recommendation system 202 can include the security filter manager 416. In one or more implementations, the security filter manager 416 can generate, maintain, and apply the end-user filter 322 of the filter engine 214. For example, security filter manager 416 can generate the end-user filter 322 including correlations between user security levels and allowable remedy recommendation information for each user security level. In at least one implementation, the security filter manager 416 can generate the final remedy recommendation 216 in any of various formats (e.g., log entry, notification, email).

As shown in FIG. 4, the client computing device 204 can include or be installed with the telemetry application 402. In one or more implementations, the telemetry application 402 can be a component specific monitoring application (e.g., an application that monitors and records telemetry data associated with an accelerated processor). Additionally, the telemetry application 402 can be a third-party application that monitors multiple system components (e.g., hardware and/or software components) to record and transmit telemetry data. In some implementations, the telemetry application 402 can transmit telemetry data to the remedy recommendation system 202 in real-time or via one or more logs or other reports.

Additionally, as shown in FIG. 4, the implementation 400 can include the telemetry service 406. In one or more implementations, the telemetry service 406 receives, requests, monitors, and/or transmits telemetry data associated with the client computing device 204. In some implementations, the telemetry service 406 can transmit telemetry data to the remedy recommendation system 202 via the telemetry application 402, or vice versa. In some implementations, the telemetry service 406 can transmit telemetry data to the remedy recommendation system 202 in real-time or via one or more logs or other reports.

The client computing device 204, the telemetry service 406, and the server(s) 408 can be communicatively coupled to each other through the network 404. The network 404 can represent any type or form of communicative network, such as the Internet, and can comprise one or more physical connections, such as a LAN, and/or wireless connections, such as a WAN.

Although FIG. 4 illustrates the implementation 400 including the remedy recommendation system 202 on the server(s) 408 (e.g., a cloud-based implementation), other arrangements are possible. For example, the remedy recommendation system 202 can be implemented on the client computing device 204. Additionally, the remedy recommendation system 202 can be implemented within a local network (e.g., a WAN or LAN) to receive telemetry data from a group of client computing devices (e.g., over Ethernet or Wi-Fi). Furthermore, in some implementations, the remedy recommendation system 202 can receive telemetry data only from the telemetry application 402 or the telemetry service 406, but not both.

Thus, as described throughout, the remedy recommendation system 202 presents a solution to the rigid and often inaccurate remedy recommendations generated by previous systems. For example, by implementing a rule-based approach that is further augmented with a machine learning-based approach, the remedy recommendation system 202 presents a resilient pipeline that can detect failures in a significantly higher percentage of noisy telemetry data. Because the remedy recommendation system 202 is more tolerant of noisy data, the remedy recommendations generated by the remedy recommendation system 202 are more accurate to deep and complex issue root-causes. Additionally, because the remedy recommendation system 202 presents a completely automatic solution to remedy recommendation generation, these remedy recommendations are generated quickly—in a matter of minutes rather than days or even weeks as is common with previous systems.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
generating rule-based root-cause outputs and telemetry-based unknown outputs from telemetry data from a client computing device;
generating machine learning-based root-cause predictions by applying a root-cause machine learning model to the telemetry-based unknown outputs; and
generating one or more root-cause remedy recommendations specific to the client computing device and based on the rule-based root-cause outputs and the machine learning-based root-cause predictions.

2. The computer-implemented method of claim 1, further comprising, prior to generating the rule-based root-cause outputs and telemetry-based unknown outputs:
receiving the telemetry data from the client computing device; and
parsing the telemetry data based on a rule-based model and the root-cause machine learning model.

3. The computer-implemented method of claim 2, wherein receiving the telemetry data from the client computing device comprises receiving raw and unstructured data from one or more of offline logs and real-time telemetry sources.

4. The computer-implemented method of claim 3, wherein parsing the telemetry data based on the rule-based model and the root-cause machine learning model comprises:
parsing the telemetry data into structured data based on one or more of the offline logs and the real-time telemetry sources;
parsing the structured data into attributes specific to the rule-based model; and
parsing the structured data into attributes specific to the root-cause machine learning model.

5. The computer-implemented method of claim 4, wherein parsing the telemetry data based on the rule-based model and the root-cause machine learning model further comprises generating one or more of engineered features, data encodings, customized mappings, and data augmentations based on the attributes specific to the rule-based model and the attributes specific to the root-cause machine learning model.

6. The computer-implemented method of claim 2, further comprising generating a filtered remedy recommendation tailored to a user security level associated with the client computing device based on the one or more root-cause remedy recommendations specific to the client computing device and end-user data extracted from the telemetry data from the client computing device.

7. The computer-implemented method of claim 1, further comprising:
modifying the rule-based root-cause outputs in light of the machine learning-based root-cause predictions; and
generating client-specific root-cause results from the machine learning-based root-cause predictions and the modified rule-based root-cause outputs.

8. The computer-implemented method of claim 7, wherein the one or more root-cause remedy recommendations specific to the client computing device are generated by applying a recommendation engine to the client-specific root-cause results.

9. The computer-implemented method of claim 8, wherein the recommendation engine comprises a plurality of trained machine learning-based recommendation units.

10. The computer-implemented method of claim 9, wherein the recommendation engine further comprises one or more of lookup tables or rule-based recommendations.

11. The computer-implemented method of claim 1, further comprising:
generating machine learning-based unknowns by applying the root-cause machine learning model to the telemetry-based unknown outputs; and
re-training the root-cause machine learning model based on the machine learning-based unknowns.

12. A system comprising:
at least one processor; and
physical memory comprising computer-executable instructions that, when executed by the at least one processor, cause the at least one processor to perform acts comprising:
generating rule-based root-cause outputs and telemetry-based unknown outputs from telemetry data from a client computing device;
generating machine learning-based root-cause predictions by applying a root-cause machine learning model to the telemetry-based unknown outputs; and
generating one or more root-cause remedy recommendations specific to the client computing device and based on the rule-based root-cause outputs and the machine learning-based root-cause predictions.

13. The system of claim 12, further comprising computer-executable instructions that, when executed by the at least one processor, cause the at least one processor to perform acts comprising, prior to generating the rule-based root-cause outputs and telemetry-based unknown outputs:
receiving the telemetry data from the client computing device; and
parsing the telemetry data based on a rule-based model and the root-cause machine learning model.

14. The system of claim 13, wherein receiving the telemetry data from the client computing device comprises receiving raw and unstructured data from one or more of offline logs and real-time telemetry sources.

15. The system of claim 14, wherein parsing the telemetry data based on the rule-based model and the root-cause machine learning model comprises:
parsing the telemetry data into structured data based on one or more of the offline logs and the real-time telemetry sources;
parsing the structured data into attributes specific to the rule-based model; and
parsing the structured data into attributes specific to the root-cause machine learning model.

16. The system of claim 15, wherein parsing the telemetry data based on the rule-based model and the root-cause machine learning model further comprises generating one or more of engineered features, data encodings, customized mappings, and data augmentations based on the attributes specific to the rule-based model and the attributes specific to the root-cause machine learning model.

17. The system of claim 12, further comprising computer-executable instructions that, when executed by the at least one processor, cause the at least one processor to perform acts comprising:
modifying the rule-based root-cause outputs in light of the machine learning-based root-cause predictions; and
generating client-specific root-cause results from the machine learning-based root-cause predictions and the modified rule-based root-cause outputs.

18. The system of claim 17, wherein the one or more root-cause remedy recommendations specific to the client computing device are generated by applying a recommendation engine to the client-specific root-cause results.

19. The system of claim 18, wherein the recommendation engine comprises a plurality of trained machine learning-based recommendation units.

20. A non-transitory computer-readable medium comprising one or more computer-executable instructions that, when executed by at least one processor of a computing device, cause the computing device to:
generate rule-based root-cause outputs and telemetry-based unknown outputs from telemetry data from a client computing device;
generate machine learning-based root-cause predictions by applying a root-cause machine learning model to the telemetry-based unknown outputs; and
generate one or more root-cause remedy recommendations specific to the client computing device and based on the rule-based root-cause outputs and the machine learning-based root-cause predictions.

* * * * *